United States Patent [19]
Tanaka et al.

[11] Patent Number: 5,966,350
[45] Date of Patent: *Oct. 12, 1999

[54] MAGNETO-OPTICAL RECORDING MEDIUM AND METHOD OF READING THE SAME

[75] Inventors: Tsutomu Tanaka; Ken Tamanoi, both of Kanagawa, Japan

[73] Assignee: Fujitsu Limited, Kawasaki, Japan

[*] Notice: This patent is subject to a terminal disclaimer.

[21] Appl. No.: 09/041,200

[22] Filed: Mar. 12, 1998

Related U.S. Application Data

[63] Continuation of application No. 08/815,056, Mar. 11, 1997, Pat. No. 5,754,500.

[30] Foreign Application Priority Data

Oct. 25, 1996 [JP] Japan .................................. 8-284108

[51] Int. Cl.$^6$ ...................................................... G11B 11/00

[52] U.S. Cl. ........................................ 369/13; 428/694 ML

[58] Field of Search ................................ 369/13, 14, 110, 369/116; 360/59, 114; 365/122; 428/694 ML, 694 MM

[56] References Cited

U.S. PATENT DOCUMENTS

| | | | |
|---|---|---|---|
| 5,163,031 | 11/1992 | Osato | 369/13 |
| 5,502,692 | 3/1996 | Osato | 369/13 |
| 5,616,428 | 4/1997 | Nishimura et al. | 428/694 |
| 5,623,458 | 4/1997 | Matsumoto et al. | 369/13 |
| 5,631,096 | 5/1997 | Nakajima et al. | 428/694 |
| 5,640,374 | 6/1997 | Hirokane et al. | 369/13 |
| 5,740,133 | 4/1998 | Tamanoi et al. | 369/13 |

FOREIGN PATENT DOCUMENTS

| | | |
|---|---|---|
| 1143041 | 6/1989 | Japan . |
| 393056 | 4/1991 | Japan . |
| 393058 | 4/1991 | Japan . |
| 4271039 | 9/1992 | Japan . |
| 512731 | 1/1993 | Japan . |
| 7244877 | 9/1995 | Japan . |

Primary Examiner—Tan Dinh
Attorney, Agent, or Firm—Greer, Burns & Crain Ltd.

[57] ABSTRACT

By defining the composition of the second magnetic layer, the magneto-optical recording medium is capable of reading out at MSR whether the readout magnetic field is applied in the erasing direction or its reverse recording direction, and when a readout magnetic field is applied in the recording direction, the reading method of the magneto-optical recording medium is further enhanced in resolution.

4 Claims, 13 Drawing Sheets

MAGNETO-OPTICAL RECORDING MEDIUM AND METHOD OF READING THE SAME

This is a continuation of application Ser. No. 08/815,056, filed Mar. 11, 1997 now patented U.S. Pat. No. 5,754,500.

BACKGROUND OF THE INVENTION

The present invention relates to a magneto-optical recording medium, such as magneto-optical disk, magneto-optical tape, and magneto-optical card, and a method of reading the same, and more particularly to a magneto-optical recording medium that can be reproduced at magnetically induced super-resolution.

In recent years, magneto-optical disks have been attracting much attention as external storage media for computers. The magneto-optical disk uses an external magnetic field and a laser beam to form record marks of submicron size on the medium, and can achieve a drastic increase in storage capacity as compared with other external recording media such as flexible disks and hard disks.

To enable the recording of a tremendous amount of data such as moving pictures, a further increase in the storage capacity of magneto-optical disks is demanded. To increase the recording density, it is needed to form more record marks on the medium, that is, to define the length of record mark shorter than the spot diameter of Laser beam and to narrow the interval of record marks. Forming of such fine record marks is relatively easy, but, there is a limit in the length of record marks that can be read due to restrictions of the wavelength ($\lambda$) of the laser beam to be emitted and the numerical aperture (NA) of the objective lens.

Accordingly, various magnetically induced super-resolution (MSR) readout methods for reading record marks smaller than the laser beam diameter have been proposed (Japanese Patent Application Laid-Open Nos. 1-143041 (1989), 3-93056 (1991), 3-93058 (1991), 4-271039 (1992), and 5-12731 (1993)). In all these conventional methods, a magneto-optical disk laminating plural magnetic layers including a recording layer and a readout layer is rotated, a readout laser beam is emitted to cause a temperature distribution in the peripheral direction of the magneto-optical disk, and record marks smaller than the spot diameter are read by making use of this temperature distribution. That is, in a certain temperature region within a spot of readout laser beam, the readout layer has a direction of magnetization so as to mask the record mark, and in other region, on the other hand, the direction of magnetization of the recording layer is transferred on the readout layer and is read out.

In these conventional methods, the record mark can be read out from a region smaller than the spot diameter of the readout laser beam, which substantially brings about the same resolution as when reading out by a light spot smaller than the spot diameter of the readout laser beam. These conventional methods, however, had the following problems. First, in the method of reading out record marks from the low-temperature region in the spot, although the resolution is excellent in the peripheral direction, the crosstalk by adjacent tracks is significant, or in the method of reading out record marks from the high-temperature region in the spot, although the crosstalk is decreased, a large initializing magnet is needed for initializing the readout layer, and the apparatus is not reduced in size, and further in the method of reading out record marks from a region changed in the direction of magnetization of the readout layer from the in-plane direction to perpendicular direction due to temperature distribution, although it is possible to read out without using a large initializing magnet, the transferred region in the spot is wide, and high readout output is not obtained.

Accordingly, the present applicant proposed an MSR readout method capable of solving these problems (Japanese Patent Application Laid-Open No. 7-244877 (1995)). FIG. 1 is a diagram showing the film composition of the conventional magneto-optical disk capable of reading out at MSR proposed by the present applicant and the direction of magnetization in readout. FIG. 2 is a diagram showing the state of magnetization when erasing this magneto-optical disk, and FIG. 3 is a diagram showing the state of magnetization when recording.

As shown in FIG. 1, a magneto-optical disk 20 is formed by laminating a base layer (not shown) made of SiN, a readout layer 21, an intermediate layer 22, a recording layer 23 respectively made of rare-earth transition-metal amorphous alloy, and a protective layer (not shown) made of SiN sequentially on a polycarbonate resin substrate (not shown). The readout layer 21 is transition-metal magnetization dominant, and has an easy axis of magnetization in the perpendicular direction, that is, the lamination direction. The intermediate layer 22 is rare-earth magnetization dominant, and has an easy axis of magnetization in the in-plane direction at room temperature (10 to 35° C.), and over a predetermined temperature higher than room temperature, the easy axis of magnetization is changed from the in-plane direction to the perpendicular direction. The recording layer 23 is transition-metal magnetization dominant, and has an easy axis of magnetization in the perpendicular direction. Supposing the Curie temperatures of the readout layer 21, intermediate layer 22 and recording layer 23 to be respectively Tc1, Tc2 and Tc3, the relation of Tc2<Tc1, Tc2<Tc1) is satisfied. Supposing the coercive forces of the readout layer 21 and recording layer 23 at room temperature to be respectively Hc1 and Hc3, the relation of Hc3>Hc1 is satisfied.

When erasing record marks on the magnet-optical disk 20, as shown in FIG. 2, while applying an downward erasing magnetic field, a erasing laser beam is emitted. At this time, the region irradiated with the laser beam is heated at curie temperature Tc3 or more, so that the direction of magnetization of the recording layer 23 is aligned in the same downward direction as the erasing magnetic field. A region away from the erasing laser beam is cooled to room temperature. At room temperature, the intermediate layer 22 is an in-plane magnetized film as mentioned above, and the readout layer 21 and the intermediate layer 22 are not coupled magnetically. Therefore, the direction of magnetization of the readout layer 21 is aligned in the same downward direction as the erasing magnetic field. In the magneto-optical disk 20, meanwhile, the erasing direction is expressed downward, the recording direction, upward reverse to the erasing direction.

When recording record marks on the magneto-optical disk 20, as shown in FIG. 3, while applying an upward recording magnetic field, a recording laser beam is emitted. This recording method is realized by two manners, the light modulation recording and magnetic field modulation recording. The light modulation recording is a method of irradiating by modulating so that the intensity of laser beam may correspond to the information while always applying an upward recording magnetic field, and only the region irradiated with laser beam of high intensity has the same upward direction of magnetization as the recording magnetic field, so that record marks are formed therein. On the other hand, the magnetic field modulation recording is a method of applying by modulating the direction of magnetic field up and down so as to correspond to the information while always emitting recording laser beam, and the direction of magnetization in the region irradiated with the laser beam is aligned in the direction of the applied magnetic field. In making use of magnetic field modulation recording, when recording information from erased state, the direction of magnetization is inverted upward in the region applied with a magnetic field reverse to the erasing magnetic field, and record marks are formed therein.

A region away from the recording laser beam is cooled to room temperature. At room temperature, the intermediate layer 22 is an in-plane magnetized film as mentioned above, and the readout layer 21 and recording layer 23 are not coupled magnetically. Therefore, the direction of magnetization of the readout layer 21 is aligned in the direction of magnetization by applying a small magnetic field, and it is not necessary to use a large initializing magnet.

The state of magnetization in readout of thus recorded magneto-optical disk 20 is explained by reference to FIG. 1. A readout laser beam is emitted to the magneto-optical disk 20, and a downward readout magnetic field is applied to the irradiated region. In a low-temperature region ahead of the laser beam (a region lower than substantially 100° C.), the exchange coupled force between the intermediate layer 22 and recording layer 23 is weak, and the magnetization of the intermediate layer 22 is aligned in the direction of readout magnetic field, that is, in the downward direction. By the exchange coupled force between the intermediate layer 22 and readout layer 21, the direction of magnetization of the readout layer 21 is aligned in the upward direction, and acts to mask the direction of magnetization of the recording layer 23 (front mask). A high-temperature region (a region higher than substantially 180° C.) is a region beyond the Curie temperature of the intermediate region 22, and the exchange coupled force between the intermediate layer 22 and readout layer 21 is cut off. As a result, the direction of magnetization of the readout layer 21 is aligned in the direction of readout magnetic field, and acts to mask the direction of magnetization of the recording layer 23 (rear mask). In an intermediate-temperature region between the low-temperature region and the high-temperature region (a region of substantially 100° C. to substantially 180° C.), the direction of magnetization of the recording layer 23 is transferred onto the readout layer 21 by the exchange coupled force between the recording layer 23 and readout layer 21 through the intermediate layer 22.

Therefore, when a magneto-optical output is detected, since the mask is formed in the region of low temperature and region of high temperature in the laser spot S, the magneto-optical signal is not read out from the regions, so that the magneto-optical signal is read out only from the intermediate-temperature region.

Thus, according to the magneto-optical disk proposed by the present applicant, the MSR readout is enabled without using large initializing magnet, and a partial area of high-temperature region (an intermediate-temperature region) is an aperture, and a high readout output is obtained, and moreover since the adjacent tracks are lower-temperature regions than the intermediate-temperature region, so that the signal is not read out from the adjacent tracks, and therefore the crosstalk is low.

However, when varying the direction of magnetic field applied at the time of readout of thus constituted magneto-optical disk 20, that is, when the same upward readout magnetic field as the recording direction is applied in this magneto-optical disk 20, forming of front mask tends to be difficult. This is because the control of exchange coupled force is difficult at low temperature between the intermediate layer 22 and recording layer 23 in the prior art. When a readout magnetic field in the recording direction is applied, the direction of magnetization of the intermediate region 22 is not aligned with the readout magnetic field in low-temperature region, and forming of front mask is hence imperfect, and the readout characteristic deteriorates.

BRIEF SUMMARY OF THE INVENTION

The invention is devised to solve the above problems, and it is hence an object of the invention to present a magneto-optical recording medium capable of reading out at MSR by applying a readout magnetic field in either the erasing direction or its reverse recording direction, by limiting the composition of a second magnetic layer.

To achieve the object, the invention provides a magneto-optical recording medium comprising a first magnetic layer formed from GdFeCo, laminated on a substrate and having characteristic of easy magnetization in the lamination direction; a second magnetic layer formed from GdFeCo, being rare-earth magnetization dominant, laminated on the first magnetic layer and having characteristic of easy magnetization in an in-plane direction at room temperature, the second magnetic layer having a composition of $Gd_x(Fe_{100-y}Co_y)_{100-x}$, of which x and y satisfy respectively $26 \leq x \leq 38$, $0 \leq y \leq 17$; and a third magnetic layer formed from TbFeCo, laminated on the second magnetic layer and having characteristic of easy magnetization in the lamination direction.

By irradiating the magneto-optical recording medium with a light beam accompanied by the relative move when reading out, a temperature distribution is formed in the beam spot. In the low-temperature region and the high-temperature region of this temperature distribution, the direction of magnetization of the first magnetic layer masks the direction of magnetization of the third magnetic layer. In the intermediate-temperature region between these regions, the direction of magnetization of the third magnetic layer is transferred to the first magnetic layer, and an aperture is formed, so that record marks smaller than the spot diameter can be red out. In order to form a mask of the first magnetic layer in the low-temperature region and the high-temperature region, a readout magnetic field is applied in the light beam illuminated region.

In this invention, since the second magnetic layer has the composition satisfying $26 \leq x \leq 38$, $0 \leq y \leq 17$ in $Gd_x(Fe_{100-y}Co_y)_{100-x}$, the MSR readout is enabled whether the readout magnetic field is applied in the erasing direction for erasing all of record marks or in the recording direction reverse to the erasing direction. The relation of $26 \leq x \leq 38$, $0 \leq y \leq 17$ is determined from the composition range of the second magnetic layer in which the readout characteristics such as CNR and crosstalk may be favorable as shown in FIG. 9 to FIG. 12 below. The size of the aperture is smaller in the width direction of the record track when the readout magnetic field is applied in the recording direction than when applied in the erasing direction. Accordingly, when the readout magnetic field in the recording direction is applied, a higher resolution is obtained, and the crosstalk is decreased.

In the magneto-optical recording medium of the invention, the second magnetic layer has a film thickness of 15 nm or more.

The film thickness of the second magnetic layer is closely related with the strength of the exchange coupled force between the second magnetic layer and third magnetic layer, and if too thin, the exchange coupled force is strong, and the direction of magnetization of the second magnetic field is not oriented in the direction of the readout magnetic field in the low-temperature region, so that mask forming may be imperfect. The practical level of readout magnetic field is 500 Oe or less, and in order to form the mask perfectly at this level, the film thickness of the second magnetic layer is preferred to be 15 nm or more. From the viewpoint of practical thickness level of the magneto-optical recording medium, the maximum film thickness of the second magnetic layer is about 60 nm.

It is another object of the invention to present a reading method further enhanced in resolution and decreased in crosstalk by reading out at MSR by applying a reading magnetic field in the recording direction.

To achieve the object, the invention provides a reading method of a magneto-optical recording medium, which comprises a first magnetic layer formed from GdFeCo, laminated on a substrate and having characteristic of easy magnetization in the lamination direction; a second magnetic layer formed from GdFeCo, being rare-earth magnetization dominant, laminated on the first magnetic layer and having characteristic of easy magnetization in an in-plane direction at room temperature, the second magnetic layer having a composition of $Gd_x(Fe_{100-y}Co_y)_{100-x}$, of which x and y satisfy respectively $26 \leq x \leq 38$, $0 \leq y \leq 17$; and a third magnetic layer formed from TbFeCo, laminated on the second magnetic layer and having characteristic of easy magnetization in the lamination direction, and records information by forming a region inverted in the direction of magnetization from a first direction to a second direction and a region maintaining the first direction of magnetization in the third magnetic layer, the method comprising the step of irradiating a magneto-optical recording medium with a light beam accompanied by the relative move, and the step of reading out information by applying a magnetic field in the second direction at least in the region irradiated with the light beam.

Therefore, the magneto-optical recording medium is recorded by the light modulation recording system, that is, by emitting the recording light beam so that the direction of magnetization of the region heated over the Curie temperature of the third magnetic layer is aligned in the recording direction which is the second direction. When reading out the information in this magneto-optical recording medium, by applying a readout magnetic field in the recording direction, the information can be read out from the narrow aperture, and hence a high resolution is obtained and the crosstalk is decreased.

Moreover, the invention further provides a reading method of a magneto-optical recording medium, which comprises a first magnetic layer formed from GdFeCo, laminated on a substrate and having characteristic of easy magnetization in the lamination direction; a second magnetic layer formed from GdFeCo, being rare-earth magnetization dominant, laminated on the first magnetic layer and having characteristic of easy magnetization in an in-plane direction at room temperature, the second magnetic layer having a composition of $Gd_x(Fe_{100-y}Co_y)_{100-x}$, of which x and y satisfy respectively $26 \leq x \leq 38$, $0 \leq y \leq 17$; and a third magnetic layer formed from TbFeCo, laminated on the second magnetic layer and having characteristic of easy magnetization in the lamination direction, and records information by aligning previously the direction of magnetization of the third magnetic layer in a first direction, and applying by modulating the direction of magnetic field, thereby forming a region inverted in the direction of magnetization from the first direction to a second direction and a region maintaining the first direction in the third magnetic layer, the method comprising the step of irradiating a magneto-optical recording medium with a light beam accompanied by the relative move, and the step of reading out information by applying a magnetic field in the second direction at least in the region illuminated with the light beam.

Therefore, the magneto-optical recording medium has the direction of magnetization of the third magnetic layer aligned in the erasing direction by applying the magnetic field in the erasing direction which is the first direction previously, and is recorded by the magnetic field modulation recording system, that is, by applying the recording magnetic field by modulating the direction so that the direction of magnetization of the region heated over the Curie temperature of the third magnetic layer is aligned in the direction of the recording magnetic field. When reading out the information in this magneto-optical recording medium, by applying a readout magnetic field in the second direction which is reverse to the erasing direction, the information can be read out from the narrow aperture, and hence a high resolution is obtained and the crosstalk is decreased.

The above and further objects and features of the invention will more fully be apparent from the following detailed description with the accompanying drawings.

DETAILED DESCRIPTION OF THE INVENTION

Figure 1:
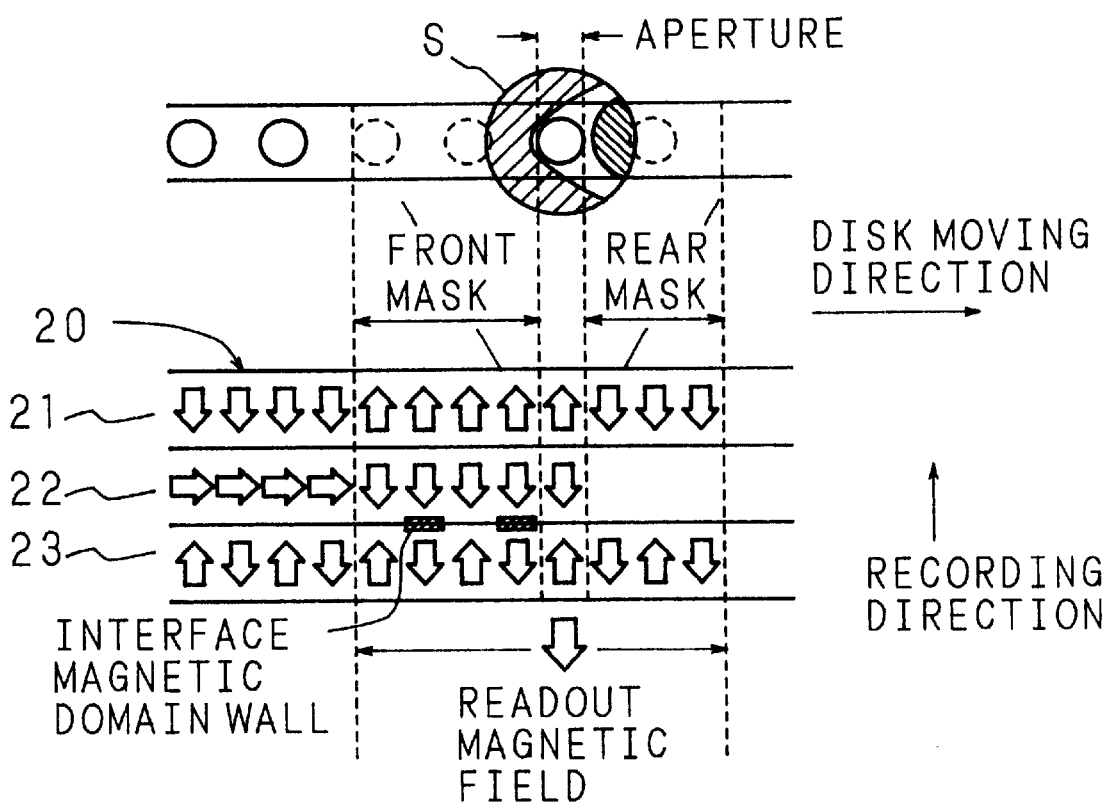
FIG. 1 is a diagram showing the film composition of a conventional magneto-optical disk and state of magnetization at the time of readout.
Figure 2:
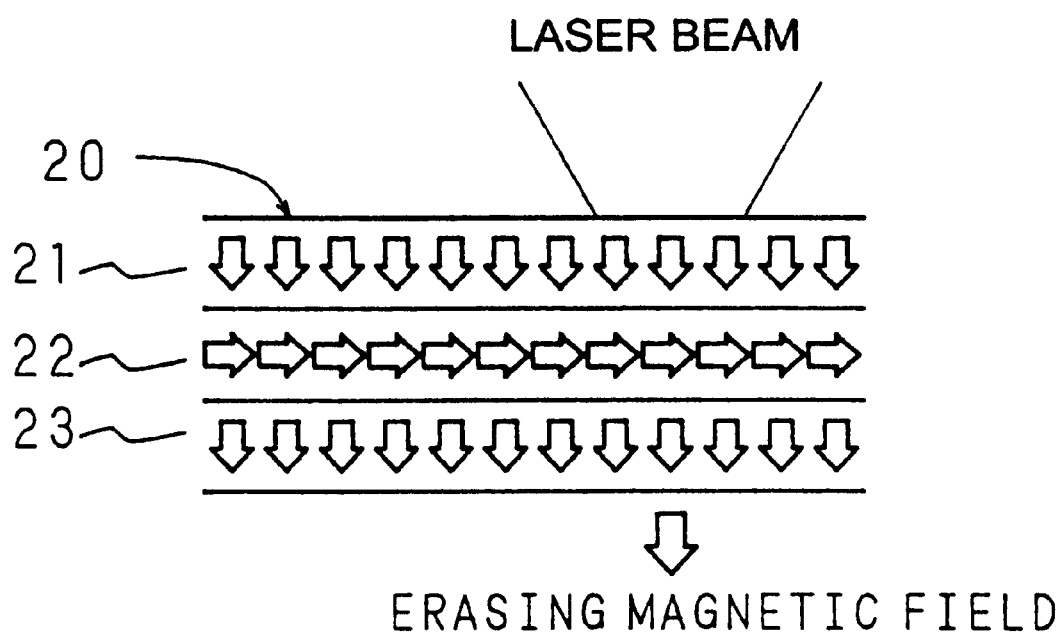
FIG. 2 is a diagram showing the state of magnetization at the time of erasing of the conventional magneto-optical disk.

Referring now to the drawings, embodiments of the invention are described in detail below.

Embodiment 1

Figure 4:
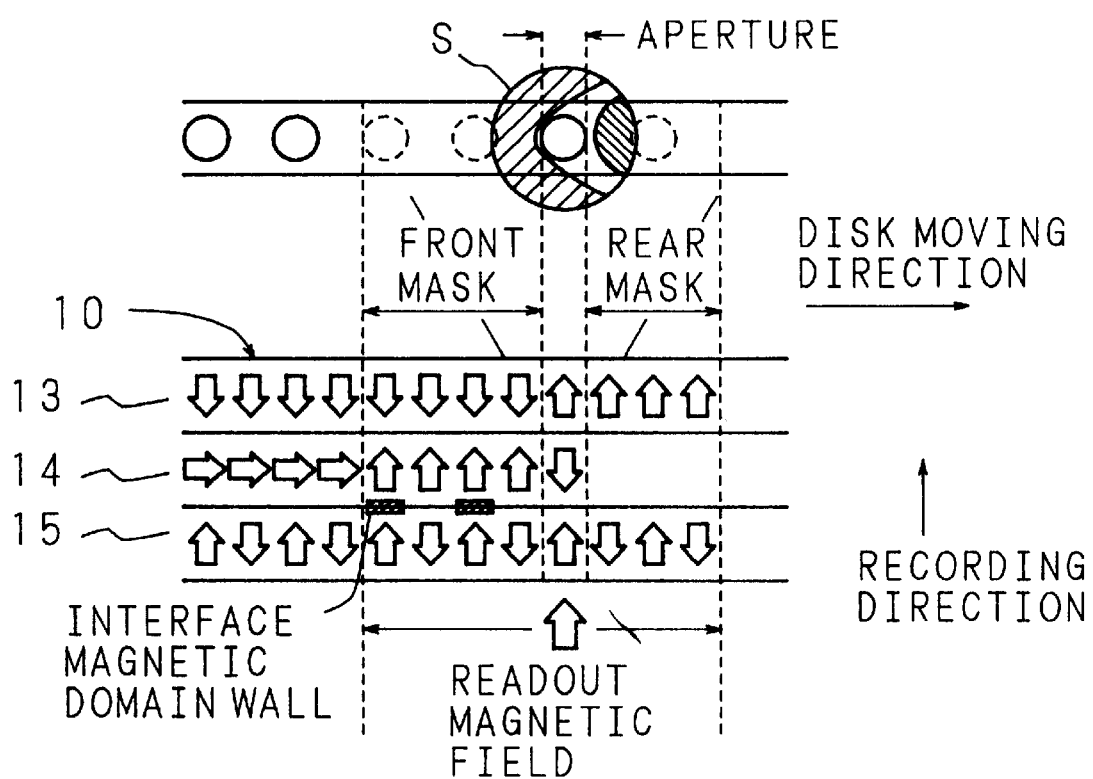
FIG. 4 is a diagram showing the state of magnetization at the time of readout of a magneto-optical disk of the invention.
Figure 5:
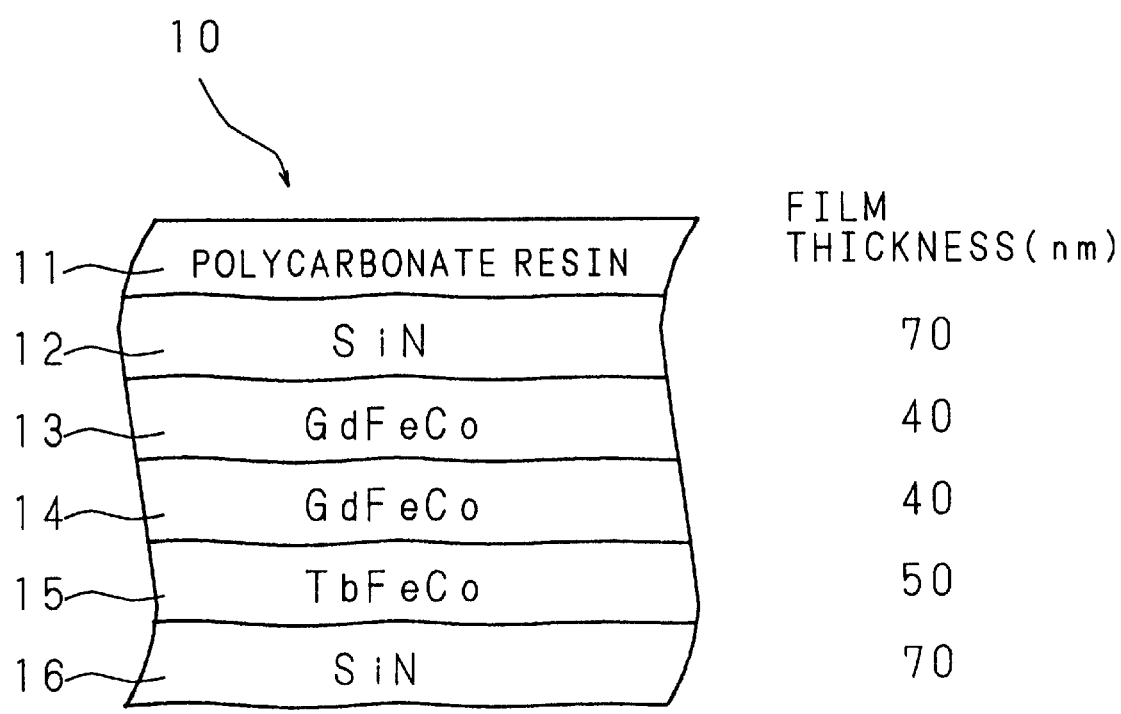
FIG. 5 is a film composition diagram of the magneto-optical disk of the invention.

FIG. 4 is a diagram showing the state of magnetization at the time of readout of a magneto-optical disk of the invention, and FIG. 5 is a film composition diagram of the same magneto-optical disk. As shown in FIG. 5, a magneto-optical disk 10 is formed by laminating a base layer 11 made of SiN, a readout layer 13 (first magnetic layer) made of GdFeCo, an intermediate layer 14 (second magnetic layer) made of GdFeCo, a recording layer 15 (third magnetic layer) made of TbFeCo, and a protective layer 16 made of SiN, sequentially on a polycarbonate resin substrate 11. The substrate 11 is 1.2 mm in thickness, and the land width and groove width are formed at pitches of 0.7 μm individually therein, so that land/groove recording is enabled. The concrete composition and magnetic characteristic of the readout layer 13, intermediate layer 14, and recording layer 15 for constituting the magneto-optical disk 10 of the embodiment are shown in TABLE 1.

TABLE 1

The magneto-optical disk 10 having such constitution is manufactured in the following procedure. First, in a chamber of a sputtering apparatus, targets of SiN, GdFeCo and TbFeCo are set. The substrate 11 is put into the chamber, and the chamber internal pressure is controlled at $1 \times 10^{-5}$ Pa. Then, argon gas and nitrogen are introduced into the chamber, and each partial pressure is adjusted to gas pressure of 0.4 Pa at 3:2 ($Ar:N_2$). In this condition, the base layer 12 is formed on the substrate 11 in a film thickness of 70 nm by DC sputtering method.

The chamber is set again to $1 \times 10^{-5}$ Pa, and argon gas is introduced into the chamber to 0.8 Pa, and the readout layer 13 is formed on the base layer 12 in a film thickness of 40 nm, and sequentially the intermediate layer 14 is formed in a film thickness of 40 nm, and the recording layer 15 in a film thickness of 40 nm. Then setting the chamber once more to $1 \times 10^{-5}$ Pa, argon gas and nitrogen are fed into the chamber, and each partial pressure is adjusted to the gas pressure of 0.4 Pa at 3:2 ($Ar:N_2$), and the protective film 16 is formed in a film thickness of 70 nm by DC sputtering method.

Figure 3:
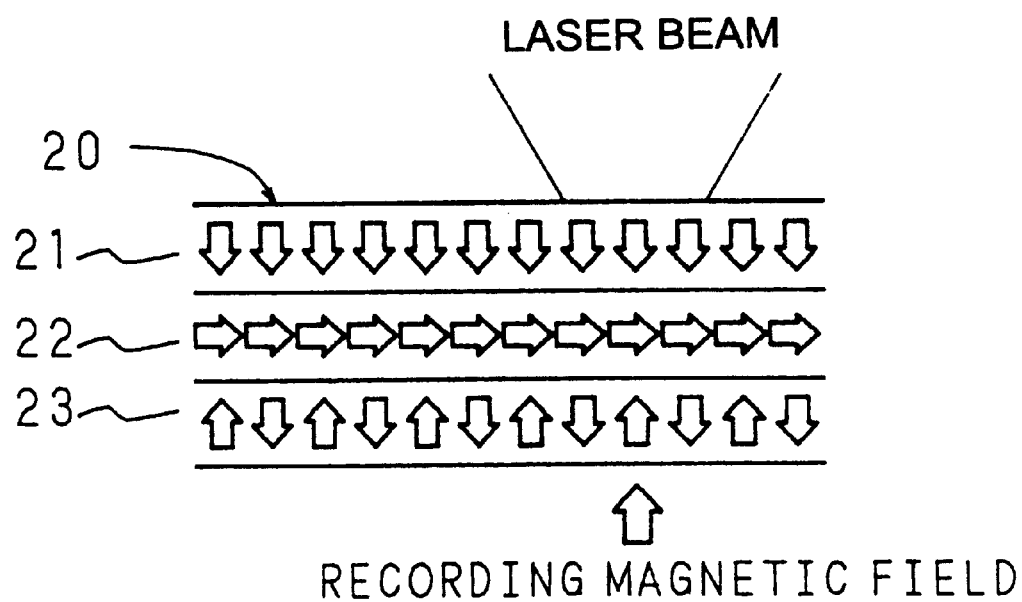
FIG. 3 is a diagram showing the state of magnetization at the time of recording of the conventional magneto-optical disk.

In the recording layer 15 of thus manufactured magneto-optical disk 10, information is recorded magneto-optically, and the state of magnetization when reading it out is described below. The recording principle in the magneto-optical disk 10 is same as shown in FIG. 3, and the description is omitted herein. In this embodiment, meanwhile, the recording direction is expressed upward, the erasing direction, downward.

The magneto-optical disk 10 is irradiated with a readout laser beam, and a readout magnetic field is applied in the irradiated region in the recording direction, that is, in the upward direction. In the low-temperature region (a region lower than about 100° C.) ahead of the laser beam, the exchange coupled force between the intermediate layer 14 and recording layer 15 is weak, and the magnetization of the intermediate layer 14 is aligned in the direction of readout magnetic field, that is, in the upward direction. Consequently, by the exchange coupled force of the intermediate layer 14 and readout layer 13, the direction of magnetization of the readout layer 13 is aligned downward, which functions to mask the direction of magnetization of the recording layer 15 (front mask). The high-temperature region (a region higher than substantially 180° C.) is a region above the Curie temperature of the intermediate layer 14, where the exchange coupled force between the intermediate layer 14 and readout layer 13 is cut off. As a result, the direction of magnetization of the readout layer 13 is aligned upward in the direction of magnetization of the readout magnetic field, which functions to mask the direction of magnetization of the recording layer 14 (rear mask). In the intermediate-temperature region (a region of substantially 100° C. to 180° C.) between the low-temperature region and the high-temperature region, by the exchange coupled force of the recording layer 15 and readout layer 13 through the intermediate layer 14, the direction of magnetization of the recording layer 15 is transferred on the readout layer 13, thereby forming an aperture.

Thus, double masks of front mask and rear mask are formed, and when a magneto-optical output is detected, regions high and low in temperature in the laser spot S function as the mask, and magneto-optical signal is not read out in these regions, and the magneto-optical signal is read out only from the intermediate-temperature region.

Shown below are results of investigation of the recording and readout characteristics of the magneto-optical disk 10 for MSR readout. The wavelength λ of the semiconductor laser beam of the measuring instrument used in readout is 685 nm, and the numerical aperture NA of the objective lens is 0.55. The peripheral speed of the magneto-optical disk 10 is 5 m/s.

Figure 6:
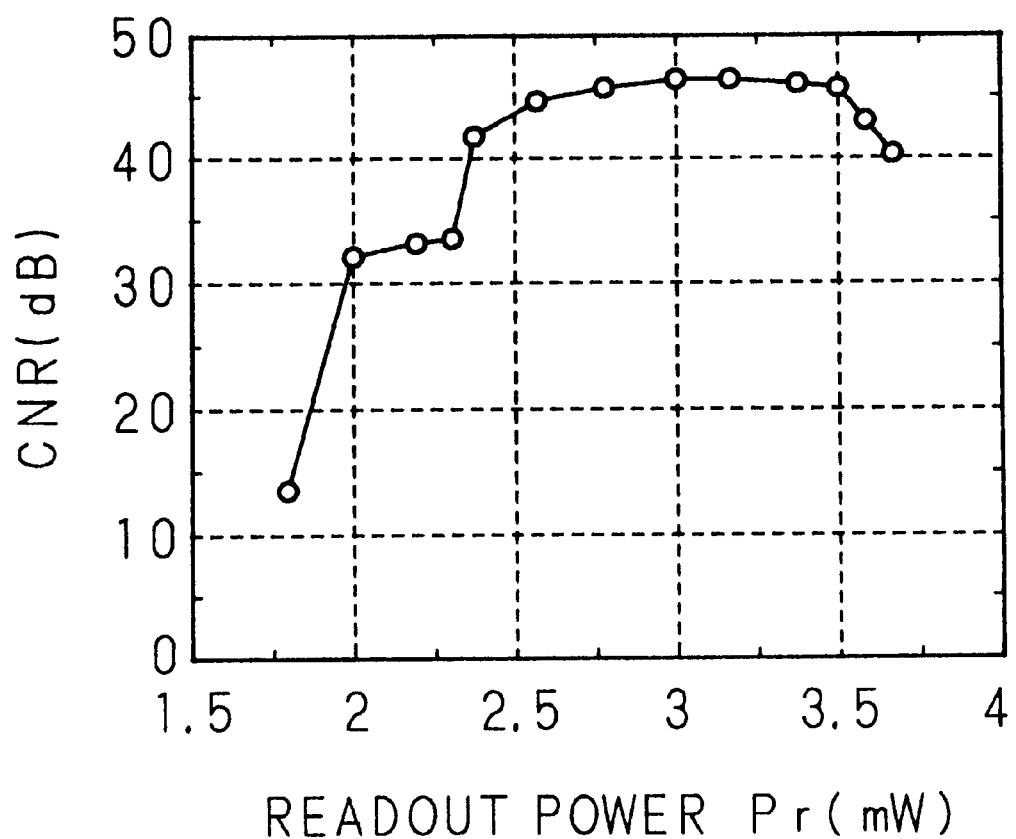
FIG. 6 is a graph showing the relation between the readout characteristic and the power of the readout laser beam of the magneto-optical disk of the invention.

With the erasing laser beam power of 8 mW, an erasing magnetic field of 300 Oe was applied downward to the magneto-optical disk 10, and the full surface was erased. With the recording laser beam power of 8.4 mW and recording frequency of 7.51 MHz, light modulation recording was conducted at duty 50% while applying an upward recording magnetic field of 300 Oe. As a result, record marks of 0.333 μm were formed on the land. At various power levels, a reading laser beam was applied to the magneto-optical disk 10, and each CNR was measured, and the readout power capable of reading out with double masks was determined. The result is shown in the graph in FIG. 6. The ordinate indicates the CNR, and the abscissa denotes the readout power. It is known from FIG. 6 that the double mask MSR readout is possible by irradiation of laser beam with readout power of 2.4 mW or more.

Figure 7:
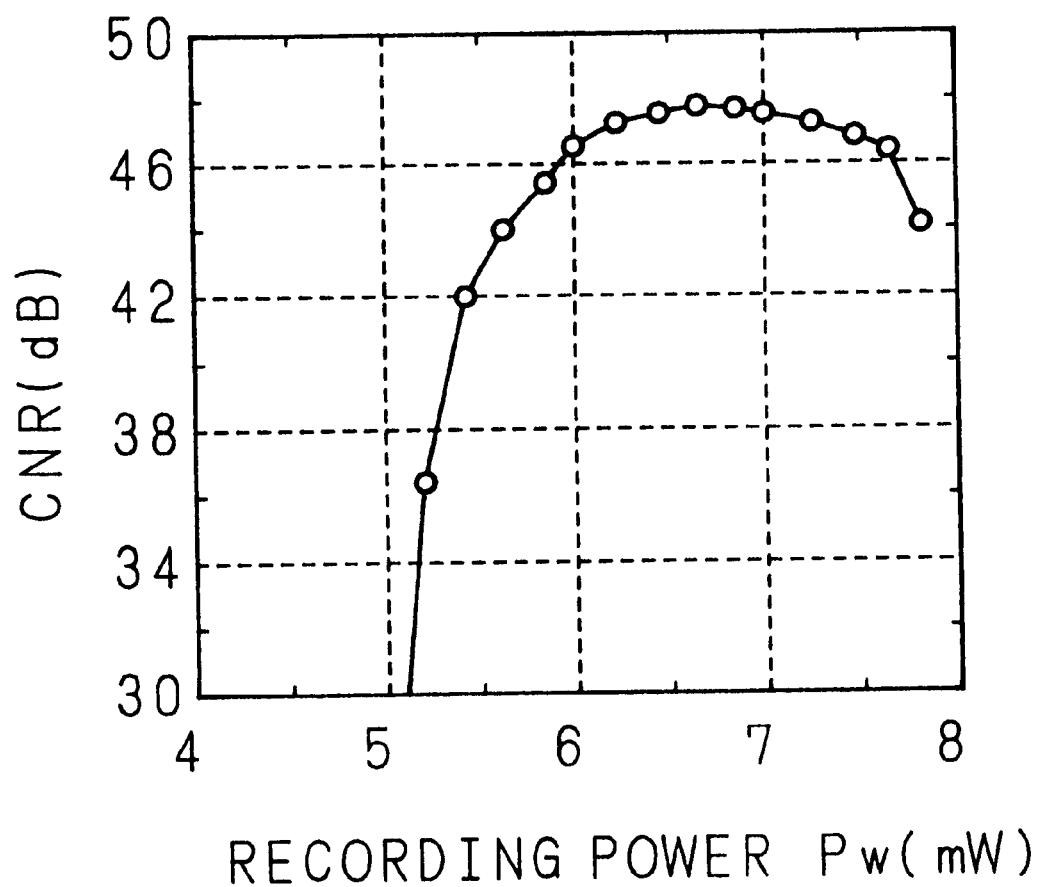
FIG. 7 is a graph showing the relation between the readout characteristic and the power of the recording laser beam of the magneto-optical disk of the invention.

Similarly, varying the power of the recording laser beam, the magneto-optical disk 10 was irradiated to record information, and readout laser beam of 3 mW was emitted to measure the CNR of the magneto-optical disk 10 of each recording power, and the dependence of the maximum readout signal quality on the recording power was studied. The result is shown in the graph in FIG. 7, in which the ordinate represents the CNR and the abscissa denotes the recording power. From FIG. 7, a maximum CNR of 47.4 dB was obtained by irradiation of laser beam with recording power of 6.5 mW.

Next, the dependence on readout magnetic field and crosstalk of the magneto-optical disk 10 were studied. By applying the upward (recording direction) readout magnetic field and downward readout magnetic field in different magnitude and without applying readout magnetic field, the CNR and crosstalk were measured. In the measuring method of crosstalk, record marks of five adjacent tracks are erased previously, and record marks are formed in the middle land, and the carrier level is measured. In the grooves at both sides of the recorded land, the carrier level is similarly measured, and the average is determined. The difference between the carrier level of the land and the average carrier level of the groove is the crosstalk.

Figure 8:
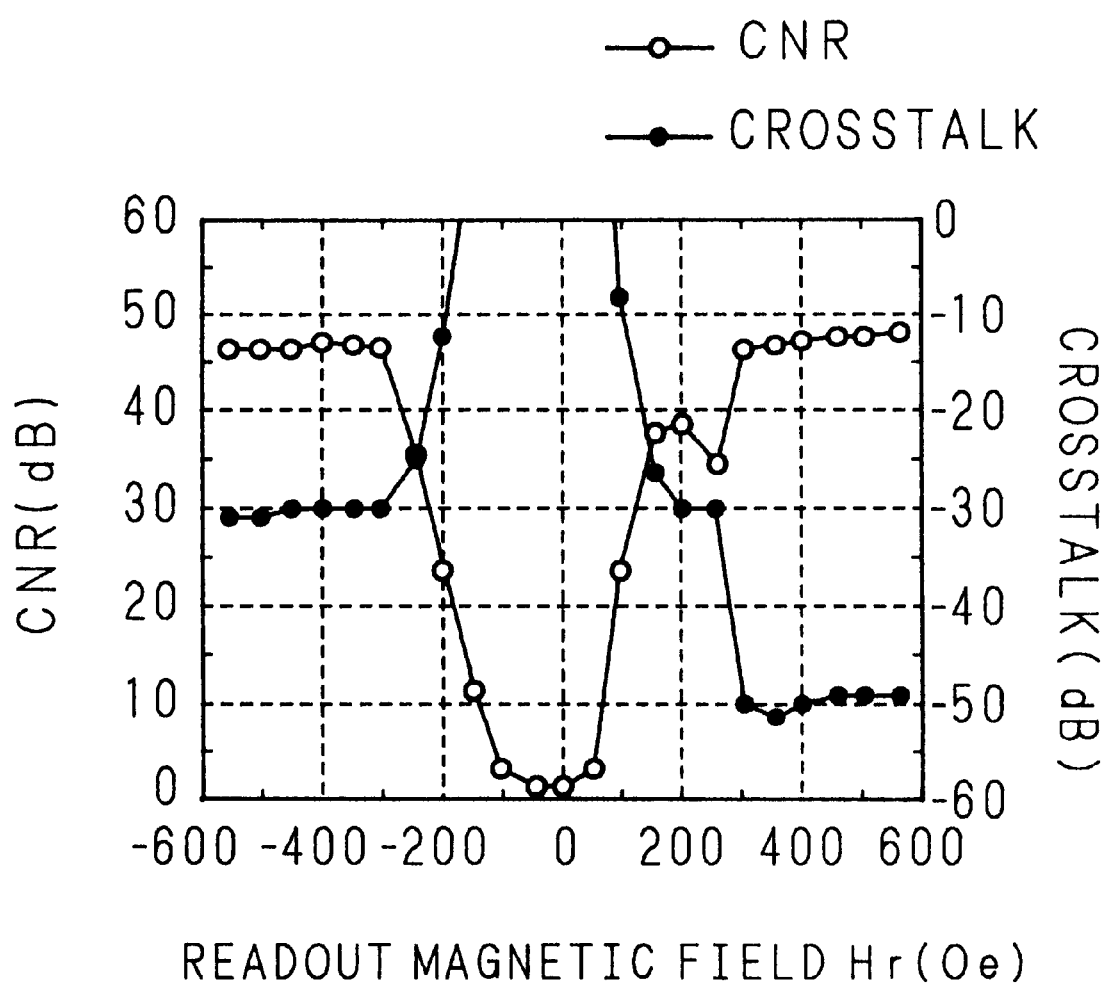
FIG. 8 is a graph showing the relation between the readout characteristic and the readout magnetic field of the magneto-optical disk of the invention.

FIG. 8 is a graph showing this result, in which the ordinate denotes the CNR and crosstalk, and the abscissa represents the readout magnetic field, the positive direction showing the recording direction and the negative direction showing the erasing direction. As clear from FIG. 8, when the readout magnetic field is upward, a similar CNR to the level in the conventional downward direction was obtained, and the crosstalk was lower by about 20 dB in the embodiment of upward readout magnetic field as compared with the prior art. This is because the shape of the aperture is different depending on the direction of the applied readout magnetic field, and the application of the readout magnetic field in the recording direction is narrower in shape in the track width direction than in the reverse direction, so that, it is expected, a lower crosstalk is obtained.

Embodiment 2

In embodiment 2, magneto-optical disks 10 were fabricated by varying the composition of the magnetic layer used in the intermediate layer 14. In these magneto-optical disks 10, light modulation recording was effected at recording frequency of 7.51 MHz and duty of 50%, and the readout CNR and crosstalk were studied. Supposing the composition of the intermediate layer 14 to be $Gd_x(Fe_{100-y}Co_y)_{100-x}$, the magneto-optical disks 10 were prepared in the compositions at different values of x in the condition of y=6, and at different values of y in the condition of x=31. The composition and manufacturing procedure of the readout layer 13 and recording layer 15 and the other conditions than the composition of the intermediate layer 14 are same as in embodiment 1, and descriptions are omitted.

Figure 9:
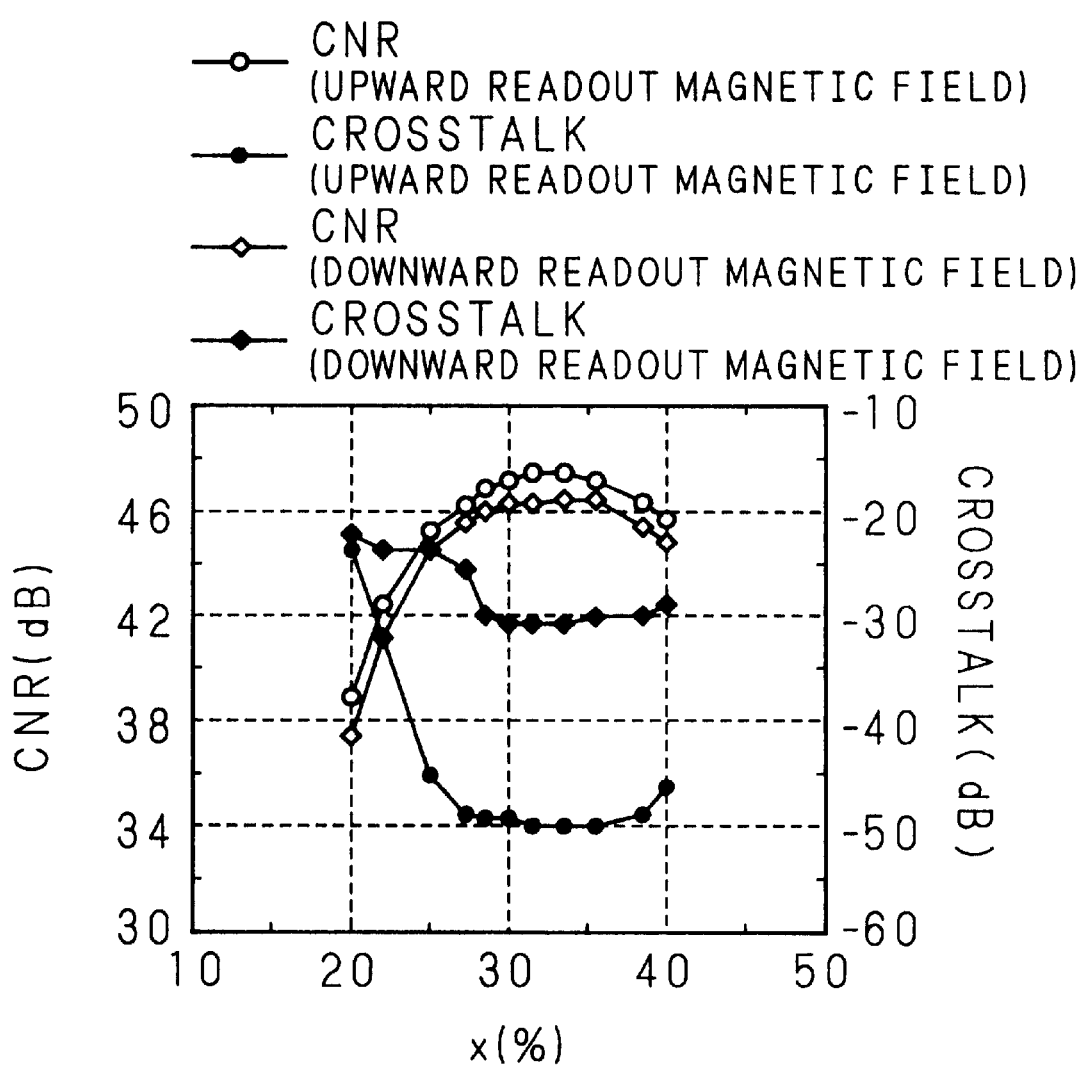
FIG. 9 is a graph showing the relation between the readout characteristic and the direction of readout magnetic field with respect to x of the intermediate layer of the magneto-optical disk (light modulation recording) of the invention.

First, in the magneto-optical disks 10 at various values of x in the condition of y=6 of $Gd_x(Fe_{100-y}Co_y)_{100-x}$ of the intermediate layer 14, a readout magnetic field of 400 Oe was applied upward (in the recording direction) and downward (in the prior art), respectively. FIG. 9 is a graph showing the results of measurement of maximum CNR and crosstalk at this time, in which the ordinate indicates the CNR and crosstalk, and the abscissa shows x%. As clear from FIG. 9, the CNR is slightly higher in the upward readout magnetic field than in the downward direction. The crosstalk is also lower in the upward direction. For a practical magneto-optical disk, the CNR is required to be 46 dB or more and the crosstalk −23 dB or less. Hence, when x is in a range of 26% to 36%, it is known that a sufficiently practical level is attained whether the readout magnetic field is upward or downward.

Figure 10:
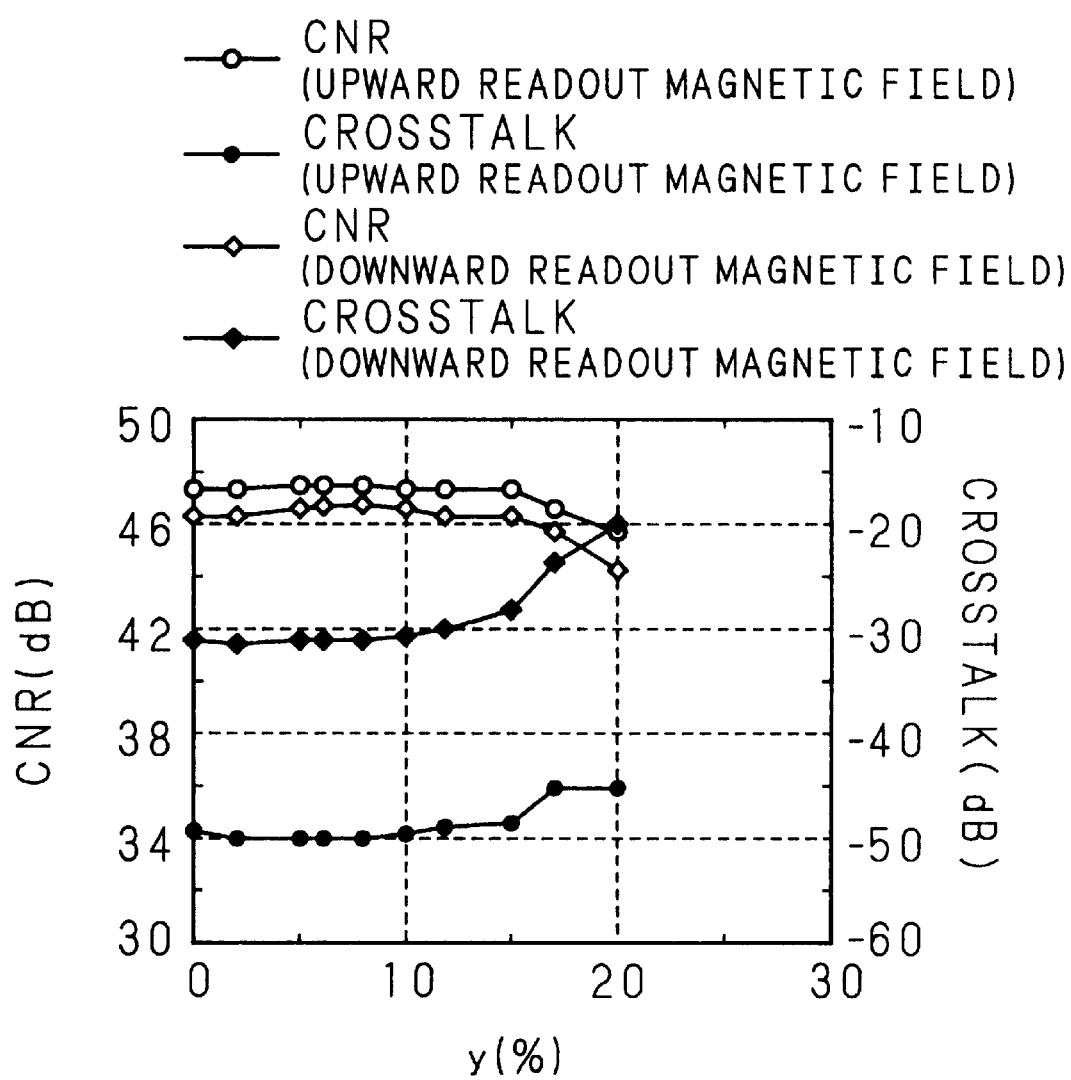
FIG. 10 is a graph showing the relation between the readout characteristic and the direction of readout magnetic field with respect to y of the intermediate layer of the magneto-optical disk (light modulation recording) of the invention.

Similarly, in the magneto-optical disks 10 at various values of y in the condition of x=31 of $Gd_x(Fe_{100-y}Co_y)_{100-x}$ of the intermediate layer 14, a readout magnetic field of 400 Oe was applied upward (in the recording direction) and downward (in the prior art). FIG. 10 is a graph showing the results of measurement of maximum CNR and crosstalk at this time, in which the ordinate indicates the CNR and crosstalk, and the abscissa shows x%. As clear from FIG. 10, the CNR is slightly higher in the upward readout magnetic field than in the downward direction. The crosstalk is also lower in the upward direction. For a practical magneto-optical disk, when y is in a range of 0 to 16%, it is known that a sufficiently practical level is attained whether the readout magnetic field is upward or downward.

As known from these results, when reading out the information recorded by light modulation recording, when the composition $Gd_x(Fe_{100-y}Co_y)_{100-x}$ of the intermediate layer 14 satisfies the relation of $26 \leq x \leq 36$ and $0 \leq y \leq 16$, whether the readout magnetic field is applied in the recording direction or erasing direction, double mask MSR readout is enabled, and when the readout magnetic field is applied in the recording direction, a readout characteristic excellent in CNR and crosstalk is achieved. Incidentally, in the case of y=0, the composition of the intermediate layer is $Gd_xFe_{100-x}$.

Embodiment 3

Embodiment 2 refers to the readout characteristic of the magneto-optical disks 10 by light modulation recording, and in embodiment 3, by magnetic field modulation recording in magneto-optical disks 10, the CNR and crosstalk were similarly measured. The magneto-optical disk 10 was irradiated with a recording laser beam of 11.0 mW, and a recording magnetic field of 300 Oe was applied, and laser pulse magnetic field modulation recording was effected. When recording, a magnetic field was applied from a floating head, and the recording frequency was 3.75 MHz. The laser beam was emitted by laser pulse (frequency 7.51 MHz) with pulse width of 40 ns, and same as in the case of light modulation recording, record marks of 0.333 μm were formed. Prior to recording, meanwhile, to define the direction of magnetic field, an erasing laser of 8 mW was emitted, and a downward erasing magnetic field was applied by 300 Oe, and the entire disk was erased.

Figure 11:
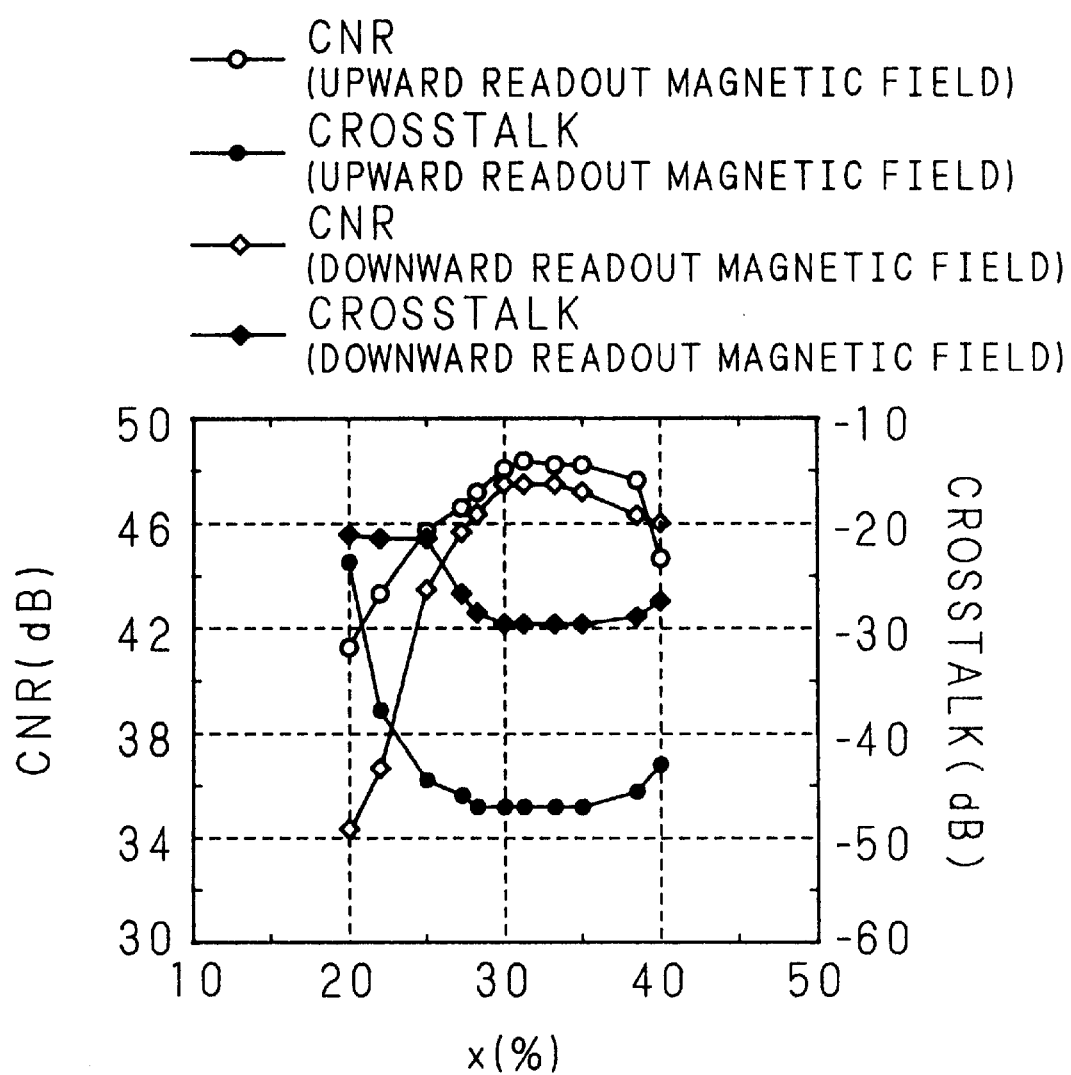
FIG. 11 is a graph showing the relation between the readout characteristic and the direction of readout magnetic field with respect to x of the intermediate layer of the magneto-optical disk (magnetic field modulation recording) of the invention.
Figure 12:
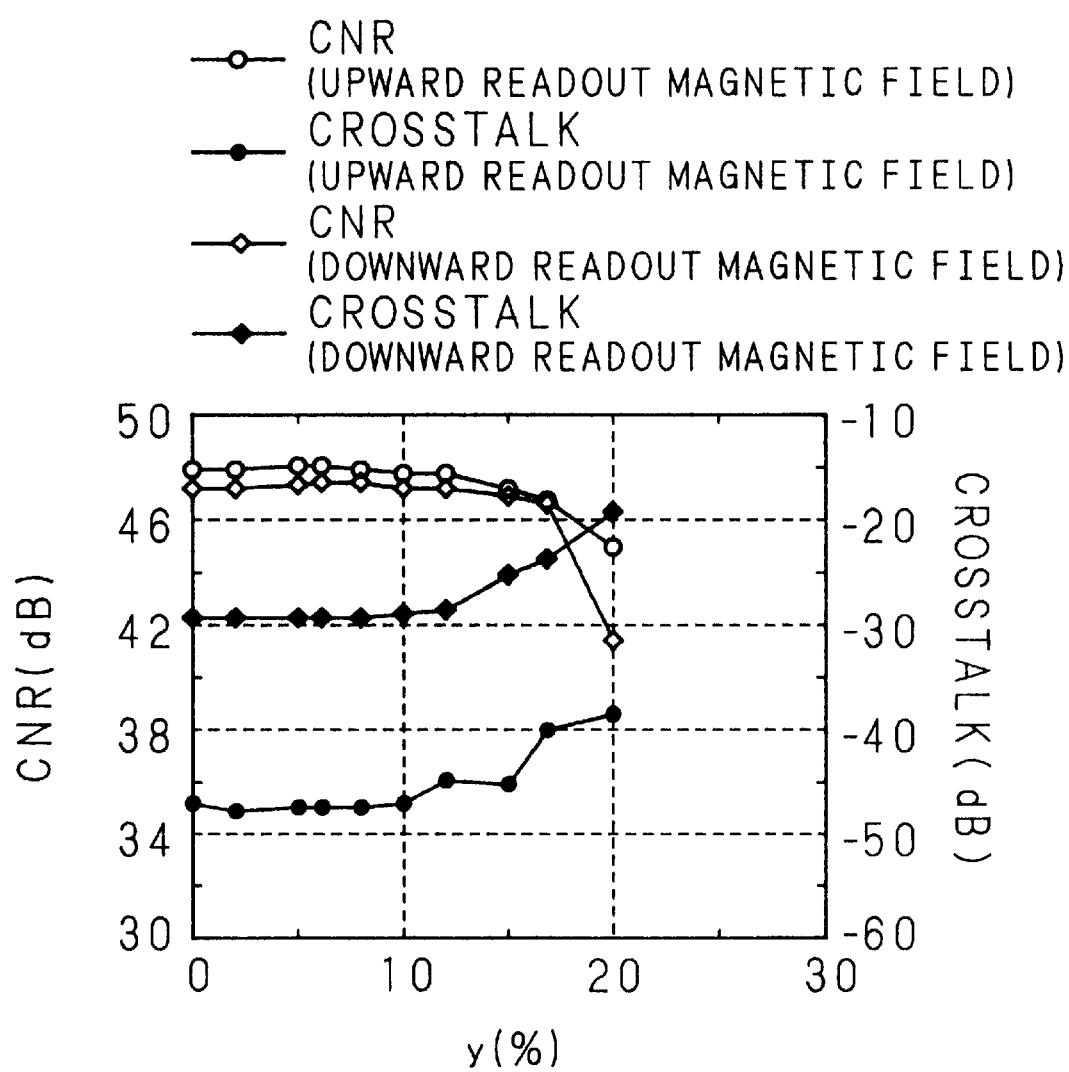
FIG. 12 is a graph showing the relation between the readout characteristic and the direction of readout magnetic field with respect to y of the intermediate layer of the magneto-optical disk (magnetic field modulation recording) of the invention.

In the magneto-optical disks 10 at various values of x in the condition of y=6 of $Gd_x(Fe_{100-y}Co_y)_{100-x}$ of the intermediate layer 14, and in the magneto-optical disks 10 at various values of y in the condition of x=31, downward (in the erasing direction) and upward (in the reverse direction of the erasing direction) readout magnetic fields were applied at 450 Oe from the floating head. FIG. 11 and FIG. 12 are graphs showing results of CNR and crosstalk in both cases, in which the ordinate indicates the CNR and crosstalk, and the abscissa shows x%. As clear from FIG. 11 and FIG. 12, as compared with light modulation recording (refer to embodiment 2), the CNR was higher and also a higher value of crosstalk was obtained. This is considered because, in magnetic field modulation recording, larger record marks in the track width direction are formed than in light modulation recording.

As clear from FIG. 11, moreover, as far as x is in a range of 26 to 38%, whether the readout magnetic field is upward or downward, a readout characteristic of practical level is obtained, and as also obvious from FIG. 12, when y is in a range of 0 to 17%, whether the readout magnetic field is upward or downward, a readout characteristic of practical level is obtained. Therefore, when reading out the information recorded by magnetic field modulation recording, when the composition $Gd_x(Fe_{100-y}Co_y)_{100-x}$ of the intermediate layer 14 satisfies the relation of $26 \leq x \leq 38$ and $0 \leq y \leq 17$, whether the readout magnetic field is applied in the erasing direction or its reverse direction, double mask MSR readout is enabled, and when the readout magnetic field is applied in the reverse direction of the erasing direction, a readout characteristic excellent in CNR and crosstalk is obtained.

Embodiment 4

Figure 13:
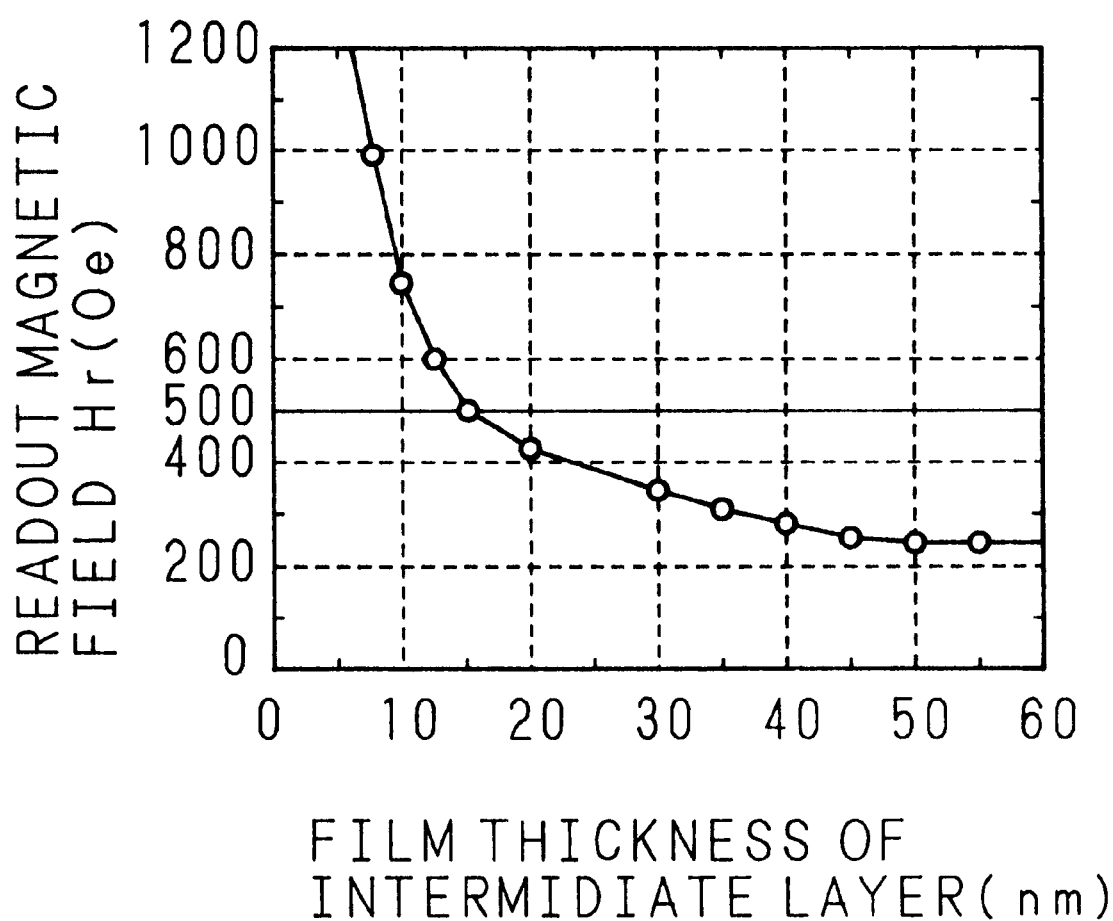
FIG. 13 is a graph showing the dependence of readout magnetic field on the film thickness of the intermediate layer of the magneto-optical disk of the invention.

The magneto-optical disks 10 same as in embodiment 1 in the composition of the intermediate layer 14 of $Gd_{31.0}(Fe_{94.0}Co_{6.0})_{69.0}$ were fabricated by various film thicknesses of the intermediate layer 14, and upward (in the recording direction) readout magnetic fields of various magnitude were applied, and the readout magnetic field was determined when the readout crosstalk of each magneto-optical disk 10 became −40 dB. As known from FIG. 13, as the film thickness increases, the crosstalk of −40 dB is obtained by a smaller readout magnetic field, and when the film thickness is about 50 nm or more, the readout magnetic field is no longer decreased. A larger readout magnetic field is needed when the film thickness of the intermediate layer 14 is smaller, which is because the exchange coupled force between the recording layer 14 and the recording layer 15 becomes higher when the film thickness of the intermediate layer 14 becomes thinner, and therefore the magnetization of the intermediate layer 14 is hardly aligned in the readout field in the low-temperature region when reading out.

The practical level of the readout magnetic field is 500 Oe or less. Hence, the film thickness of the intermediate layer 14 is preferred to be 15 nm or more. Incidentally, due to the practical limit of thickness as magneto-optical disk, the maximum film thickness of the intermediate layer 14 is about 60 nm.

Thus, in the invention, by specifying the composition of the second magnetic field, whether the readout magnetic field is applied in the erasing direction or in the reverse recording direction, double mask MSR readout is enabled, and in the case of MSR readout by applying a readout magnetic field in the recording direction, a further higher resolution is obtained, and the crosstalk is decreased, so that narrower tracks may be realized, and many other excellent effects are brought about by the invention.

As the invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

TABLE 1

|  | COMPOSITION | DOMINANT | CURIE TEMPERATURE |
|---|---|---|---|
| READOUT LAYER | $Gd_{25.0}(Fe_{83.0}Co_{17.0})_{75.0}$ | TRANSITION-METAL MAGNETIZATION DOMINANT | 280° C. |
| INTERMEDIATE LAYER | $Gd_{31.0}(Fe_{94.0}Co_{6.0})_{69.0}$ | RARE-EARTH MAGNETIZATION DOMINANT | 250° C. |
| RECORDING LAYER | $Tb_{25.0}(Fe_{68.0}Co_{32.0})_{75.0}$ | TRANSITION-METAL MAGNETIZATION DOMINANT | 310° C. |

We claim:

1. A magneto-optical recording medium, comprising:

a first magnetic layer formed from GdFeCo and having an easy direction of magnetization orthogonal to the plane of said first magnetic layer;

a second magnetic layer formed from GdFeCo, being rare-earth magnetization dominant, laminated on said first magnetic layer and having, at room temperature, an easy direction of magnetization in the plane of said second magnetic layer, said second magnetic layer comprising at least $Gd_x(Fe_{100-y}Co_y)_{100-x}$ of which x and y respectively satisfy $26 \leq x \leq 38$, $0 \leq y \leq 17$; and a third magnetic layer laminated on said second magnetic layer and having an easy direction of magnetization orthogonal to the plane of said third magnetic layer.

2. The magneto-optical recording medium according to claim 1, wherein said second magnetic layer has a film thickness $\geq 15$ nm.

3. A method for reading a magneto-optical recording medium having a first magnetic layer formed from GdFeCo and having an easy direction of magnetization orthogonal to the plane of the first magnetic layer; a second magnetic layer formed from GdFeCo, being rare-earth magnetization dominant, laminated on the first magnetic layer and having, at a room temperature, an easy direction of magnetization in the plane of the second magnetic layer, the second magnetic layer comprising at least $Gd_x(Fe_{100-y}Co_y)_{100-x}$, of which x and y respectively satisfy $26 \leq x \leq 38$, $0 \leq y \leq 17$; and a third magnetic layer laminated on the second magnetic layer and having an easy direction of magnetization orthogonal to the plane of the third magnetic layer; wherein information is recorded on the magneto-optical recording medium by forming a first region in the third magnetic layer whose magnetization direction is inverted from a first direction to a second direction, and forming a second region whose magnetization direction is maintained in the first direction, wherein the recording of information is effected by irradiating a portion of the magneto-optical recording medium with a modulated intensity light beam, said method comprising the steps of:

irradiating a magneto-optical recording medium with a light beam accompanied by a relative move; and reading out information by applying a magnetic field in said second direction at least in the region irradiated with the light beam.

4. A method for reading a magneto-optical recording medium including a first magnetic layer formed from GdFeCo and having an easy direction of magnetization in the plane formed by the first magnetic layer; a second magnetic layer formed from GdFeCo, being rare-earth magnetization dominant, laminated on the first magnetic layer and having, at a room temperature, an easy direction of magnetization in the plane formed by the second magnetic layer, the second magnetic layer comprising at least $Gd_x(Fe_{100-y}Co_y)_{100-x}$ of which x and y respectively satisfy $26 \leq x \leq 38$, $0 \leq y \leq 17$; and a third magnetic layer laminated on the second magnetic layer and having an easy direction of magnetization orthogonal to the plane formed by the third magnetic layer; wherein the magnetization direction of the third magnetic layer is aligned in a first predetermined direction, wherein information is recorded on the magneto-optical recording medium by forming a first region in the third magnetic layer whose magnetization direction is inverted from the first direction to a second direction, and forming a second region whose magnetization direction is maintained in the first direction, and wherein the recording of information is effected by applying a magnetic field whose direction of magnetization is modulated, said method comprising the steps of:

irradiating a magneto-optical recording medium with a light beam accompanied by a relative move; and reading out information by applying a magnetic field in said second direction at least in the region irradiated with the light beam.

* * * * *